Dec. 7, 1965  A. A. HOLLINGSWORTH  3,222,076
PIPE JOINT PACKING
Filed April 24, 1962  2 Sheets-Sheet 1
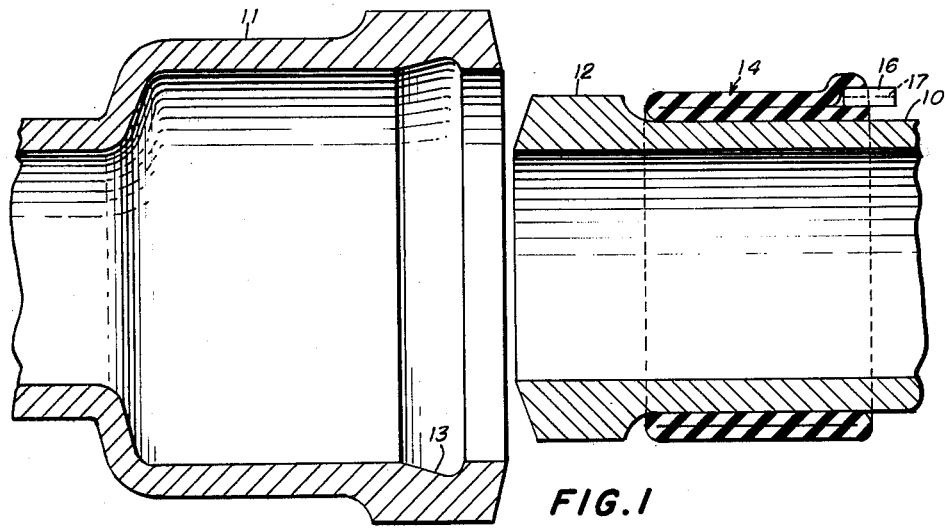
FIG.1
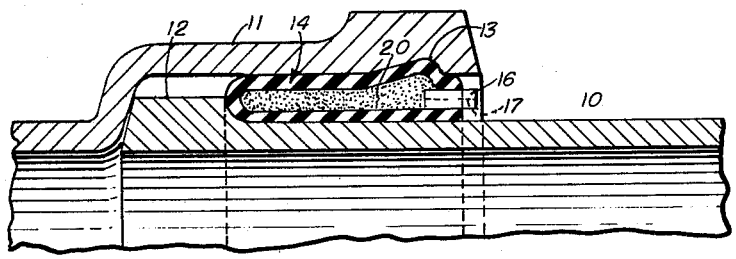
FIG.2
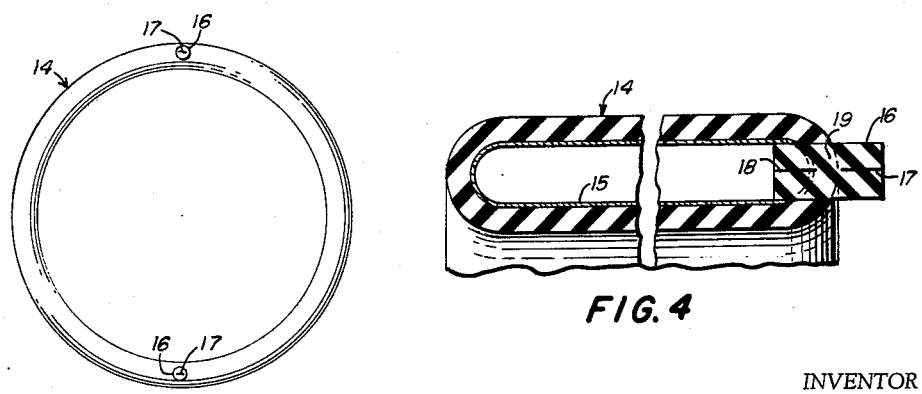
FIG.3
FIG.4
INVENTOR
ALBERT A. HOLLINGSWORTH
BY Raphael Semmes
ATTORNEY Dec. 7, 1965  A. A. HOLLINGSWORTH  3,222,076
PIPE JOINT PACKING
Filed April 24, 1962  2 Sheets-Sheet 2

INVENTOR
ALBERT A. HOLLINGSWORTH

BY Raphael Semmes

ATTORNEY

_United States Patent Office_

3,222,076
Patented Dec. 7, 1965

3,222,076
PIPE JOINT PACKING
Albert A. Hollingsworth, Anniston, Ala., assignor to Woodward Iron Company, Woodward, Ala., a corporation of Delaware
Filed Apr. 24, 1962, Ser. No. 189,847
11 Claims. (Cl. 277—34)

This invention relates to a fluid-tight mechanical joint for sections of pipe or conduit, and consists more particularly in new and useful improvements in a sealing ring or gasket comprising a hollow, annular ring of elastic material adapted to be filled and inflated hydraulically with a suitable material in liquid form at the time of introduction, but which will harden to form a permanent set.

An object of the invention is to provide a mechanical joint of this type designed to form an effective gas and liquid-tight connection which will afford ample deflection, expansion, contraction and sufficient rigidity to meet the various requirements of pipelines and conduits.

Another object of the invention is to provide an inflatable gasket designed for use as an effective seal in joint connections for conventional cast iron pipe, such as used in conducting sewage, waste, water, gases, etc.

A further object of the invention is to provide a gasket of this character which represents a distinct improvement over the conventional poured and/or caulked joints using such materials as lead, sulphur, lead sulphur compounds, cement and other packing materials, the present invention being particularly adaptable for use as a joint seal in connection with what are conventionally referred to in the trade as Cast Iron Soil Pipe and Fittings.

A still further object of the invention is to provide in an inflatable gasket, such as above referred to, a novel self-sealing valve means to facilitate the withdrawal of air from the interior of the annular gasket and replacing it with a fill material hydraulically introduced.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views:

FIGURE 1 is a longitudinal sectional view of the preferred form of the invention, showing the gasket in deflated position on the spigot end of a pipe section, and ready for insertion in the hub end of an adjacent pipe section;

FIGURE 2 is a fragmentary sectional view showing the joint assembled and with the gasket filled and inflated;

FIGURE 3 is a reduced plan view of the annular gasket;

FIGURE 4 is an enlarged sectional view through the gasket, illustrating the valve means used in evacuating air and introducing fill material;

Figure 5:
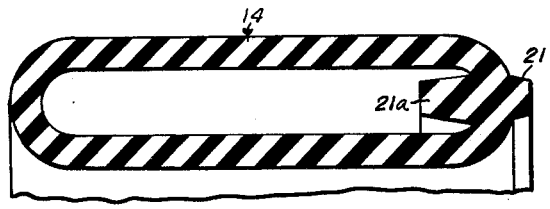
FIGURE 5 is a fragmentary sectional view showing a modified form of gasket.

In the drawings, referring first to FIGURE 1, the numerals 10 and 11 respectively represent the spigot and hub ends of two adjacent pipe sections to be joined. In the form illustrated, the spigot and hub are of conventional design, the spigot being of the type provided with an annular rim 12 on the end, and the bell 11 having a diameter sufficiently larger than the spigot and rim 12 to permit ready insertion of the spigot in the hub and provide an annular space for receiving a quantity of packing material to be inserted in the joint. In this connection, it may be noted that a plain end spigot without the enlarged rim 12 may also be sealed in a complementary hub with the gasket of the present invention.

The inner periphery of the hub 11 is conventionally provided with an annular groove 13 spaced inwardly from its open end, designed to receive the packing material employed in the joint, and, as will later appear, the gasket of the present invention coacts with the annular groove in effecting a seal.

The gasket 14, per se, comprises an annular hollow ring of elastic material such as plastic, rubber or other suitable composition having the desired strength and properties of flexibility. This ring may be internally reinforced with a lining 15 of fabric or other flexible material as shown in FIGURE 4, such reinforcement being desirable where the internal or external longitudinal forces are sufficiently great to require hydraulic pressures within the annular ring 14 higher than normal to thus retain the packing in its installed position, as will later appear.

In the preferred form of the invention shown in FIGURES 1–4, one or more valve plugs 16 are inserted through the wall of the annular ring on the outwardly directed peripheral edge thereof. As seen in FIGURE 4, the plug 16 intersects the edge wall of the ring 14 and projects a slight distance, both internally and externally thereof. Opposite ends of the valve plug, which may be formed of solid plastic, rubber or other suitable penetrable material, are preferably transversely slit as at 17 and 18, leaving a solid intermediate area 19 between the aligned slits. Obviously, the periphery of the plug 16 may be sealed to the bounding edges of the plug opening in the ring 14 by any suitable means.

Thus, the plug 16 forms a double check valve extending through the wall of the ring 14 with the slit 18 wholly within the interior of the annular ring and the slit 17 located externally of the ring. The purpose of this valve plug is to enable both the withdrawal of internal air from the annular ring 14 and the introduction of fill material for expanding the ring after the joint is assembled. A suitable hollow needle (not shown), connected to any conventional vacuum producing equipment, is introduced in the external slit 17 and forced through the solid but penetrable intermediate portion 19 of the plug and through the internal slit 18. When a vacuum has been established in the ring 14, the needle is withdrawn and the atmospheric pressure on the external surface of the valve plug automatically closes the slits and prevents the re-entry of air.

Similarly, this self-sealing valve is used for hydraulically injecting the liquid fill material to inflate the gasket as shown in FIGURE 2, said material being generally indicated by the numeral 20. Various fill materials may be employed in the inflation of the gasket 14, provided they have characteristics which enable their introduction in liquid form and chemical setting in the absence or presence of air, and which will give off no vapors nor require external heat to facilitate setting. A suitable preparation for this purpose may comprise an epoxy fill material, such as epichlorohydrin reacted with bisphenol-A. Other fill materials may be epoxy novolacs, polyesters, phenolics, melamines, etc.

As previously stated, FIGURE 1 shows the joint ready for assembly and with the annular ring or bladder 14 deflated by the means preivously described. FIGURE 2 shows the joint assembled and with the ring 14 inflated with fill material 20 which has been introduced under sufficient pressure to expand the outer surfaces of the ring into sealing engagement with the mating surfaces of the spigot 10 and hub 11, the outer face of the ring's periphery having been forced into sealing engagement with the annular groove 13 and the inner edge wall of the ring tightly embracing the adjacent edge of the spigot rim 12.

It may also be noted that in the use of this invention, two valve plugs 16 may be employed and respectively located in opposite positions in the outer peripheral edge wall with respect to the axis of the ring 14. One valve should be so located during assembly of the joint that it may be used as an air removal valve at the highest point in the ring to allow the maximum removal of air. The opposite valve should be located to permit the simultaneous introduction of liquid fill into the interior of the ring 14, and when the liquid fill reaches the air removal valve, the needle would be removed from the latter and the introduction of fill material continued through the opposite valve until the desired pressure has been attained for a tight seal at the joint.

While I have described the valve 16 as provided with slits 17 and 18 to facilitate the introduction of an exhaust or injection needle, such slits may, in some instances, be omitted, provided the plug 16 is of sufficiently penetrable material. Obviously, such a valve would also be self-sealing for the reasons above-noted.

From the standpoint of function and installation, the modified form of the invention shown in FIGURES 5-8 is the same as that just described. Here, however, instead of the individual valve plug or plugs 16, the modified gasket 14 is provided in its outer peripheral edge wall with a continuous rib 21 which intersects the edge wall of the hollow tube and projects inwardly thereof as at 21a. At annularly spaced intervals, the rib 21 is transversely slit at 22 to provide a series of needle receiving areas similar to the slits 17 in the valve plugs 16 previously described. Here, however, the slits 22 extend inwardly from the projecting outer extremity of the rib 21 to a point spaced from the inner extremity of the inner rib 21a, so as to leave a continuous solid, penetrable area in the inner rib. A needle introduced through the slit 22 penetrates this solid area and, when removed, the needle opening and slit are closed by the internal pressure in the tubular gasket and/or atmospheric pressure on the exterior of the rib 21.

This modified form of gasket may be manufactured by a conventional extrusion apparatus designed to extrude a continuous tube with a continuous rib along one edge thereof. Suitable lengths of extruded tube are formed into annular hollow rings by joining opposite ends of the extruded tube in any suitable manner, such as by vulcanizing or heat sealing.

Figure 6:
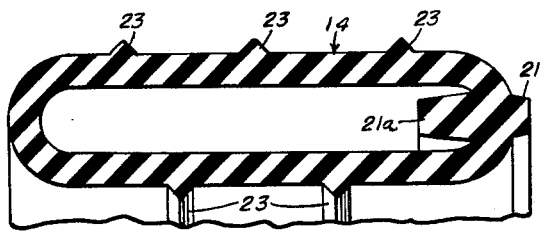
FIGURE 6 is a similar view illustrating a still further modification.
Figure 7:
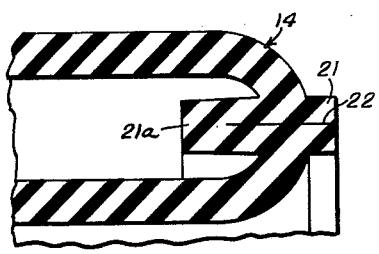
FIGURE 7 is an enlarged fragmentary section through the modified valve means.
Figure 8:
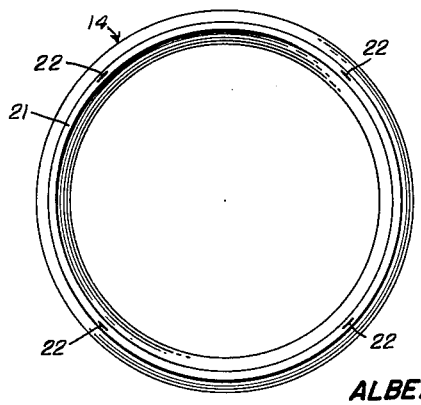
FIGURE 8 is a reduced plan view of the modified gasket shown in FIGURE 7.

The modification illustrated in FIGURE 6 is similar to that shown in FIGURE 5, but with the addition of peripheral gripping ribs 23 which may be formed in the extrusion process so as to protrude in continuous form on both the outer and inner peripheries of the ring 14. It will be apparent that these ribs facilitate the engagement of the ring with the mating surfaces of the spigot 10 and hub 11.

As will be seen, either form of the present invention provides a continuous inflatable gasket or ring which may easily be slipped over the end of the spigot 10 by stretching it over the end rim 12, if such rim is employed, and inserted in the hub 11 with the spigot. It is then a relatively simple matter to exhaust the air in the annular ring 14 by means of the needle and valve arrangements described, while simultaneously or successively inflating the ring into sealing engagement with the mating surfaces of the pipe sections through the introduction of fill material in liquid condition. After once assembled, the escape of the fill material is prevented by the dual valve arrangement, and the fill material hardens into a permanent joint, sealing with a compressed elastomeric seal. One of the important features of the invention resides in the fact that no rings or other special devices are required to hold the gasket in place, as the gasket, when inflated with hydraulic pressure, conforms to the locking features of the hub, and the fill material sets up or hardens so as to prevent the gasket or mating pipe ends from movement longitudinally, while, at the same time, providing ample deflection, expansion and contraction.

From the foregoing, it is believed that the invention may be readily understood by those skilled in the art without further description, it being borne in mind that numerous changes may be made in the details disclosed without departing from the spirit of the invention as set forth in the following claims.

I claim:

1. A fluid tight packing device for insertion between the mating surfaces of the hub and spigot ends of two adjacent pipe sections, comprising an annular, hollow ring of deflatable and inflatable material, the outer peripheral edge wall of said ring being provided with a thickened injection needle receiving member of penetrable, self-sealing material which intersects said peripheral edge wall and projects substantially, both internally and externally thereof, to provide laterally compressible areas respectively responsive to internal pressure of fill material introduced within said ring and external atmospheric pressure, to thereby serve as a double check valve.

2. A fluid tight packing device for insertion between the mating surfaces of the hub and spigot ends of two adjacent pipe sections, comprising an annular, hollow ring of deflatable and inflatable material having continuous walls of substantially uniform thickness throughout, the outer peripheral edge wall of said ring being provided with a thickened injection needle receiving member of penetrable, self-sealing material which intersects said peripheral edge wall and projects substantially, both internally and externally thereof, to provide laterally compressible areas respectively responsive to internal pressure or fill material introduced within said ring and external atmospheric pressure, to thereby serve as a double check valve.

3. A packing device as claimed in claim 1, wherein said ring is formed of elastomer material.

4. A fluid tight packing device for insertion between the mating surfaces of the hub and spigot ends of two adjacent pipe sections, comprising an annular, hollow ring of deflatable and inflatable material having continuous walls of substantially uniform thickness throughout, the outer peripheral edge wall of said ring being provided with a thickened injection needle receiving member of penetrable, self-sealing material which intersects said peripheral edge wall and projects substantially, both internally and externally thereof, to provide laterally compressible areas respectively responsive to internal pressure of fill material introduced within said ring and external atmospheric pressure, to thereby serve as a double check valve, said member being provided with a needle receiving slit which extends inwardly from the outer extremity of said member and terminates at an intermediate point therein, in a closed penetrable area.

5. A fluid tight packing device for insertion between the mating surfaces of the hub and spigot ends of two adjacent pipe sections, comprising an annular, hollow ring of deflatable and inflatable material, the outer peripheral edge wall of said ring being provided with at least one valve plug of penetrable, self-sealing material which intersects said peripheral edge wall and projects substantially, both internally and externally thereof in sealed engagement with said edge wall, to provide laterally compressible areas respectively responsive to internal pressure of fill material introduced within said ring and external atmospheric pressure, to thereby serve as a double check valve.

6. A packing device as claimed in claim 5, including at least two valve plugs arranged in said edge wall at opposite points with respect to the axis of said ring.

7. A packing device as claimed in claim 5, wherein said valve plug is provided with a needle receiving slit which extends inwardly from the outer extremity of said plug and terminates at an intermediate point therein in a closed, penetrable area.

8. A packing device as claimed in claim 5, wherein said valve plug is provided with slits which extend inwardly from opposite extremities of said plug and terminate intermediate the ends of said plug in a closed, penetrable area.

9. A fluid tight packing device for insertion between the mating surfaces of the hub and spigot ends of two adjacent pipe sections, comprising an annular, hollow ring of deflatable and inflatable material having continuous walls of substantially uniform thickness throughout, the outer peripheral edge wall of said ring being provided with an integral, continuous rib which intersects said peripheral edge wall and projects substantially, both internally and externally thereof, to provide laterally compressible areas respectively responsive to internal pressure of fill material introduced within said ring and external atmospheric pressure, to thereby serve as a double check valve.

10. A packing device as claimed in claim 9, wherein said rib is provided with a needle receiving slit which extends inwardly from the outer extremity of said rib and terminates at an intermediate point therein, in a closed, penetrable area.

11. A packing device as claimed in claim 10, including a series of annularly spaced needle receiving slits in said rib.

References Cited by the Examiner

UNITED STATES PATENTS

| 2,306,160 | 12/1942 | Freyssinet | 277—34 |
| 2,830,610 | 4/1958 | Chupa | 273—65.4 XR |
| 3,079,940 | 3/1963 | Keefe | 137—223 |

FOREIGN PATENTS

| 494,402 | 10/1938 | Great Britain. |
| 783,031 | 9/1957 | Great Britain. |

LAVERNE D. GEIGER, *Primary Examiner.*

SAMUEL ROTHBERG, EDWARD V. BENHAM,
*Examiners.*